United States Patent [19]
Fujimoto et al.

[11] Patent Number: 5,055,351
[45] Date of Patent: Oct. 8, 1991

[54] METAL THIN FILM TYPE MAGNETIC RECORDING MEDIUM

[75] Inventors: Ryo Fujimoto, Kawasaki; Katsumi Arisaka, Yokohama; Takao Sasakura, Yokohama; Hiroshi Takagi, Yokohama; Kenji Suzuki, Yokohama; Akira Shinmi, Yokohama; Rieko Kanome, Kawasaki; Morimi Hashimoto, Wako; Nobuyuki Saito, Yokohama, all of Japan

[73] Assignee: Canon Kabushiki Kaisha, Tokyo, Japan

[21] Appl. No.: 257,086

[22] Filed: Oct. 13, 1988

[30] Foreign Application Priority Data

Oct. 15, 1987 [JP] Japan .................. 62-258206
Nov. 20, 1987 [JP] Japan .................. 62-291818
Sep. 30, 1988 [JP] Japan .................. 63-246628

[51] Int. Cl.$^5$ ............................... G11B 7/24
[52] U.S. Cl. ............................ 428/336; 428/694; 428/900
[58] Field of Search ............... 428/216, 217, 219, 220, 428/336, 337, 340, 694, 900

[56] References Cited

U.S. PATENT DOCUMENTS

| | | | |
|---|---|---|---|
| 4,650,720 | 3/1987 | Yamaguchi et al. | 428/694 |
| 4,693,934 | 9/1987 | Nishimatsu et al. | 428/336 |
| 4,748,073 | 5/1988 | Sagoi et al. | 428/217 |
| 4,780,366 | 10/1988 | Nishimatsu et al. | 428/694 |
| 4,824,539 | 4/1989 | Komoda et al. | 428/694 |
| 4,828,903 | 5/1989 | Ejiri et al. | 428/694 |
| 4,833,019 | 5/1989 | Suwarnasarn | 428/694 |

FOREIGN PATENT DOCUMENTS

| | | |
|---|---|---|
| 9214 | 1/1983 | Japan . |
| 261020 | 11/1985 | Japan . |
| 29417 | 2/1986 | Japan . |
| 240428 | 10/1986 | Japan . |
| 267925 | 11/1986 | Japan . |

Primary Examiner—Merrell C. Cashion, Jr.
Attorney, Agent, or Firm—Fitzpatrick, Cella, Harper & Scinto

[57] ABSTRACT

A magnetic recording medium comprises at least a magnetic recording layer of a metal thin film on a substrate, wherein the stiffness $1/k_O$ [kgfmm] of the whole medium is within the following range:

$$0.35 \times 10^{-11} \leq 1/k_0 \leq 1.15 \times 10^{-11}$$

$$\text{wherein } 1/k_0 = 3 \sum_{k=1}^{n} E_k I_k$$

[n is a number of layers constituting the magnetic recording medium]
$E_k$: Young's modulus of the k th layer [unit:kgf/mm$^2$]
$I_k$: moment of inertia of the k th layer [unit:mm$^3$]
and the shape of the medium is a disc shape.

11 Claims, 5 Drawing Sheets

| REPRODUCED ENVELOPE (7MHz) | EVALUATION |
|---|---|
| CONTINUOUS | ◎ |
| (MAX. OUTPUT)−(MIN. OUTPUT) ≦ 3dB | ○ |
| (MAX. OUTPUT)−(MIN. OUTPUT) ≧ 3dB | △ |
|  | × |

METAL THIN FILM TYPE MAGNETIC RECORDING MEDIUM

BACKGROUND OF THE INVENTION

1. Field of the Invention

This invention relates to a metal thin film type magnetic recording medium of which magnetic recording layer is formed of a metal thin film.

2. Related Background Art

In recent years, with development of information processing technique and image processing technique, magnetic recording is increasingly demanded to have larger capacity and higher image quality. For responding to such demands, research and development have been actively done to obtain magnetic recording medium capable of high density recording. Particularly, as contrasted to the coating type magnetic recording medium generally employed at the present time, the metal thin film type magnetic recording medium having a ferromagnetic metal thin film such as Co, Co—Ni, Co—Cr, Co—O, etc. as the magnetic recording layer formed on a substrate by sputtering or vapor deposition is expected to be a promising medium suitable for high density recording.

On the other hand, also in still video system which is arousing a topic in these days, for the demands of its higher image quality and higher density recording, research and development about magnetic head, magnetic recording medium and signal processing, etc. have been progressed.

The magnetic recording medium to be used in still video system is for the time being a floppy disc of 2 inch in diameter, in view of the size, the weight which can be housed in an electronic still camera.

Also, since high frequency signals of several to ten and several MHz are utilized in the still video, recording and reproduction are performed by increasing the relative speed between the magnetic recording medium and the head. The speed conventionally used is 5.6 m/s (3600 rpm). Accordingly, when recording and reproduction are performed at a relative speed of 5.6 m/s by utilizing, for example, a high frequency signal of 7 MHz, the recording wavelength becomes 0.8 μm. For performing recording and reproduction in such short wavelength region, the extent of contact between the magnetic recording medium and the head must be substantially uniform. If the interval between the medium and the head becomes nonuniform, spacing loss occurs during recording and during reproduction, which may cause reduction or fluctuation of output.

Figure 13:
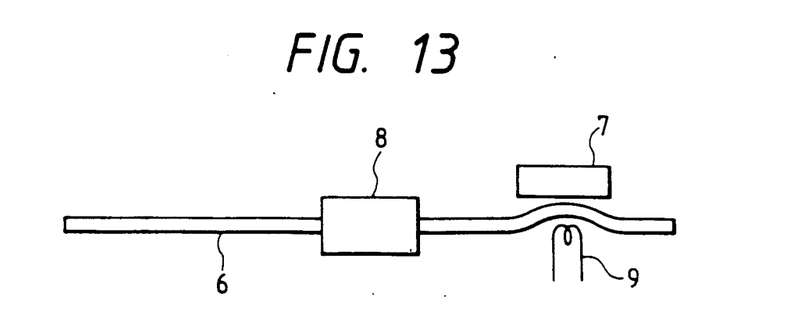
FIG. 13 is a side view showing schematically the structure of an electronic still camera.

In still video, in order to maintain the interval between the magnetic recording medium and the head, the floppy disc is endowed with appropriate stiffness and, for example, as shown in FIG. 13, a pad (guide plate with a special shape) 7 is provided to make the disc 6 and the head 9 non-contact with each other by utilizing the air film created by high speed rotation of the disc 6. Further, 8 is a center core. By employment of such so called head pad constitution, prevention of abrasion of the magnetic recording medium and the head and stabilization of head touch of the magnetic recording medium can be effected, whereby improvement of durability of the magnetic recording medium and the head can be effected. As the floppy disc to be used for the head pad type electronic still camera, the so called coating type magnetic recording medium has been used in the prior art.

However, in order to make the electronic still camera itself compact by making the floppy disc compact or increase the number of photographable sheets in one sheet of floppy disc by increasing the recording capacity of one sheet of floppy disc, it is necessary to improve the recording density of the disc. If such improvement of recording density is attempted to realize by making the recording wavelength shorter, when the coating type magnetic recording medium (for example, one using $CrO_2$, $\gamma$-$Fe_2O_3$, etc. in the magnetic layer) of the prior art is used, demagnetizing field within the magnetic layer becomes stronger as the recording signal becomes to have shorter wavelength to give rise to attenuation or rotation of residual magnetization, whereby there will ensue a problem that the reproduction output is markedly reduced.

Thus, it has been strongly desired to use a metal thin film type recording medium capable of high density recording as the floppy disc. However, no metal thin film type magnetic recording medium having good head touch with the magnetic head has yet been obtained, and when the metal thin film type magnetic recording medium is used as the floppy disc, abraded powder or flaw was generated on the surface of the medium or the head. For this reason, no excellent durability can be obtained in the metal thin film type floppy disc, whereby there has been the problem that the output is fluctuated.

SUMMARY OF THE INVENTION

The present invention has been accomplished in view of the state of the art as described above, and it is intended to provide a metal thin film type magnetic recording medium which is stable in running and excellent in durability.

According to the present invention, there is provided a magnetic recording medium comprising at least a magnetic recording layer of a metal thin film on a substrate, wherein the stiffness $1/k_0$ [kgfmm] of the whole medium is within the following range:

$$0.35 \times 10^{-11} \leq 1/k_0 \leq 1.15 \times 10^{-11}$$

$$\text{wherein } 1/k_0 = 3 \sum_{k=1}^{n} E_k I_k$$

[n is a number of layers constituting the magnetic recording medium]

$E_k$: Young's modulus of the k th layer [unit: $kgf/mm^2$]

$I_k$: moment of inertia of the k th layer [unit: $mm^3$]

and the shape of the medium is a disc shape.

DETAILED DESCRIPTION OF THE INVENTION

Figure 1:
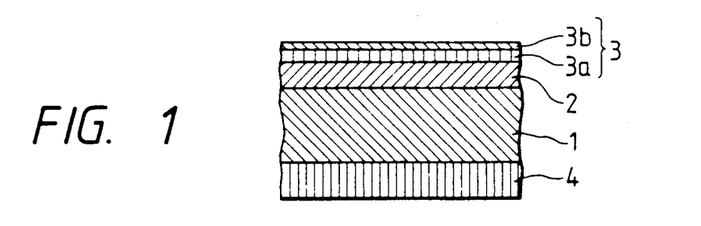
FIGS. 1 through 5 are sectional views showing examples of the magnetic recording medium of the present invention.

The magnetic recording medium of the present invention, as shown in FIG. 1, has a magnetic recording layer 2 of a metal thin film, further a protective layer 3 and a backcoat 4 formed on a substrate 1.

The substrate may be preferably a polymer film, particularly preferably polyethylene terephthalate, polysulfone, polyimide, polyamideimide, aramide, etc. On the front side or the back side of the substrate 1, for improvement of slidability of the film or running performance, durability of the medium, fine projections may be formed. However, the surface roughness of the substrate 1 should preferably be 0.05 μm or less of its maximum height in view of lowering in output due to spacing loss or drop-out.

Also, for improving running performance of the magnetic recording medium, inert particles may be added in the substrate 1. As inert particles, carbon, $CaCO_3$, $BaSO_4$, $SiO_2$, $TiO_2$, etc. may be employed, and the particle diameter may be preferably 0.005 to 0.2 μm.

For improving the magnetic characteristics of the magnetic recording medium, heat is applied during formation of a metal thin film on the substrate 1. At this time, the substrate 1 may be sometimes exposed to a temperature of 100° C. or higher to the maximum over 150° C. Accordingly, it is preferable to select a polymeric material having a high glass transition point for the substrate 1. The substrate 1 should preferably have a glass transition point of 180° C. or higher, further 210° C. or higher.

With respect to heat resistance, a polyimide may be preferably used as the substrate 1. A specific example of the polyimide to be used for the substrate of magnetic recording medium is a polybiphenyl type imide (PBI) represented by the formula (I):

obtained by condensation polymerization of p-phenylenediamine (PPD) and biphenyltetracarboxylic dianhydride (BPDA) represented by the formula (II):

This PBI has the following characteristics:

(1) It has a glass transition temperature of 500° C. or higher.

(2) Since a halogenated phenol is used as the solvent and condensation (dehydration) is effected after imidation is completely ended, there is little roughening or defect on the substrate surface, whereby the surface roughness can be made ultra-smooth up to Rmax (maximum height) 0.005 μm.

(3) Since it has a coefficient of thermal expansion of $1 \times 10^{-6}$ to $3 \times 10^{-5}$ cm/cm/°C., which is approximate to that of the metal thin film layer used as the magnetic recording layer, whereby generation of curl by heat will scarcely occur.

(4) Since it has a Young's modulus as high as 800 to 1200 kg/mm², the thickness of the substrate can be made thinner when used as the floppy disc for electronic still camera.

As commercial products of such PBI, for example, there is Upilex S type produced by Ube Kosan K.K.

Otherwise, the polyimide useful as the substrate may include those of the formula (III) shown below, or those described in Japanese Laid-open Patent Publication No. 61-158025 (U.S. Pat. No. 4,673,612), etc.:

As the commercial product of the polyimide of the above formula (III), there is, for example, Upilex R type produced by Ube Kosan K.K.

The magnetic recording layer 2 is a metal thin film composed mainly of Fe, Ni or Co, a ferromagnetic alloy such as Co—Ni, Co—Cr, etc., a ferromagnetic oxide or a ferromagnetic nitride, etc. The magnetic recording layer 2 is formed by the physical vapor deposition method such as the vacuum vapor deposition method, the ion plating method, the sputtering method, etc. or the plating method, etc. Among them, the Co—Cr vertically magnetized film comprising 15 to 23 wt. % of Cr and the balance of Co, formed by the vacuum vapor deposition method or the sputtering method is very excellent for high density recording as compared with the interplanar magnetized medium of the prior art.

On the magnetic recording layer 2, for the purpose of improving abrasion resistance, lubricity, corrosion resistance, a protective layer 3 is generally formed. The protective layer 3 is frequently constituted of an inorganic protective layer 3a such as oxide film formed on the surface of the magnetic recording layer 2, $Al_2O_3$, $SiO_2$, $Co_3O_4$, Co—Cr—O, Co—NI—O, Mo, Ni, diamond-like carbon, etc. and an organic lubricant layer 3b such as fluorine type resin, ester type oligomer, etc.

formed on the inorganic protective layer 3a. However, the inorganic protective layer 3a or the organic protective layer 3b may be also formed alone as the protective layer 3. The inorganic protective film 3a and the organic protective film 3b are formed by the physical vapor deposition method such as vacuum vapor deposition, sputtering, ion plating, etc., or the coating liquid coating method.

As the backcoat 4, one conventionally used as the backcoat for the magnetic recording medium in the prior art can be used. For example, those having inorganic fine particles such as carbon black, graphite or $CoCO_3$, etc. dispersed in a binder such as polyester resin, polyurethane resin. etc. can be used. The backcoat 4 can be formed by, for example, the coating liquid coating method.

Figure 2:
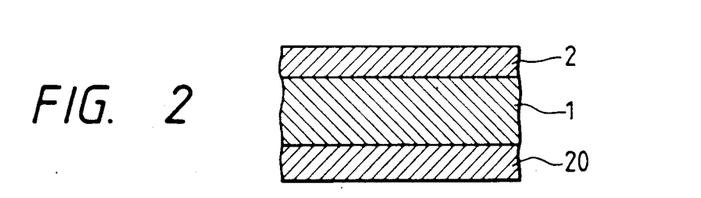

Also, for preventing curl generated on the magnetic recording medium, as shown in FIG. 2, a second magnetic recording layer 20 which is the same as the magnetic recording layer 2 may be formed on the back (the surface opposite to the surface on which the magnetic recording layer 2 is formed) of the substrate 1 to give symmetry to the whole magnetic recording medium. In the cases, curl cannot be sufficiently corrected even a second magnetic recording layer 20 may be laminated as described above. This is estimated to be because the thermal properties of the substrate 1 are changed by the influence of the heat during vapor deposition of the recording layer 2 on the front side, and even if the recording layer 20 on the back side may be vapor deposited under entirely the same conditions as the recording layer 2 on the front side, due to the change in substantial conditions (thermal properties of the substrate 1), no symmetry in the thickness direction of the magnetic recording medium can be obtained, whereby curl cannot be sufficiently corrected. In such case, by controlling the thickness of the recording layer 20 on the back side, namely thinner or thicker than the recording layer 2 on the front side, curl can be sufficiently corrected.

Figure 3:
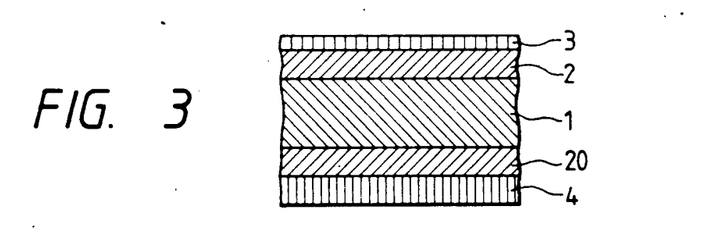

The magnetic recording medium shown in FIG. 3 has a magnetic recording layer 2 and a protective layer 3 provided on the front side of the substrate 1, a second magnetic recording layer 20 formed on the back side, and further a backcoat 4 formed on the second magnetic recording layer 20. The backcoat 4 may not be provided in some cases depending on the use environment and the use. The second magnetic recording layer 20 shown in FIG. 3 is not required to be provided depending on the extent of curl.

Figure 4:
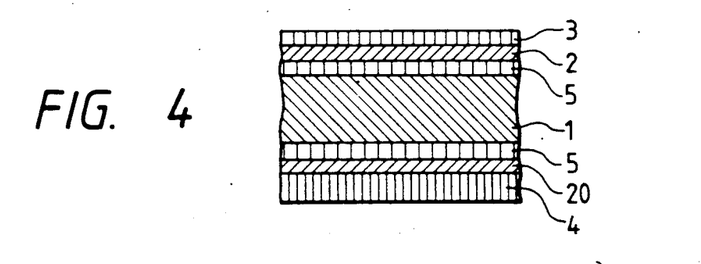

The magnetic recording medium shown in FIG. 4 is the same recording medium as the embodiment shown in FIG. 3 except for having subbing layer 5 laminated on both surfaces of the substrate 1. As the subbing layer 5, for the purpose of improved adhesive force, improving crystal orientation or improving magnetic characteristics, there can be used thin film such as Al, Ge, Cr, Ti, $SiO_2$, etc., or high magnetic permeability layer such as Fe—Ni layer, Co—Ni layer, etc. as the subbing layer for vertical magnetic recording layer. The subbing layer 5 can be formed by lamination according to the sputtering method, the vacuum vapor deposition method, the ion plating method, etc.

Figure 5:
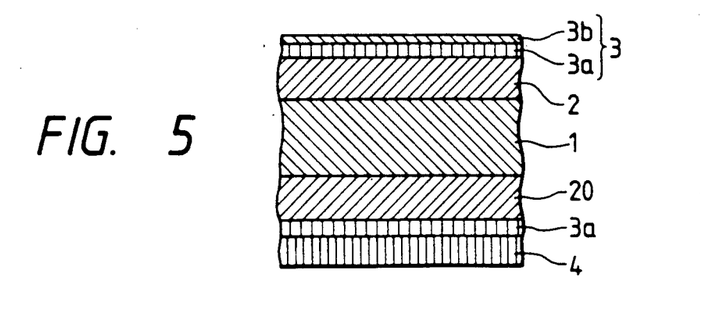

The magnetic recording medium shown in FIG. 5 has magnetic recording layer 2, 20 and an inorganic protective layer 3a formed in symmetric form on both surfaces of the substrate 1, and an organic protective layer 3b formed on the front side and a backcoat 4 on the back side.

The embodiment of the magnetic recording medium of the present invention which has magnetic recording layers 2, 20 of the Co—Cr vertically magnetized film provided on the both sides of the substrate 1, and further protective layers 3 of $SiO_2$ provided on the magnetic recording layers 2, 20, is particularly preferable.

Now, in the magnetic recording medium of the present invention, stiffness of whole medium is as follows:

$$0.35 \times 10^{-11} \leq \frac{1}{k_0} \leq 1.15 \times 10^{-11} \quad (1)$$

$$\text{wherein } \frac{1}{k_0} = 3 \sum_{k=1}^{n} E_k I_k$$

[n is a number of layers constituting the magnetic recording medium.]

[n is a number of layers constituting the magnetic recording medium.]
$E_k$: Young's modulus of the k th layer [unit: $kgf/mm^2$]
$I_k$: moment of inertia of the k th layer [unit: $mm^3$]
The above $1/k_0$ should further preferably as follows:

$$0.45 \times 10^{-11} \leq \frac{1}{k_0} \leq 0.75 \times 10^{-11}$$

The above k th layer means all the layer constituting the magnetic recording medium, including the substrate 1.

The magnetic recording medium of the present invention can maintain the interval between the magnetic recording medium and head substantially constant during running of the magnetic recording medium by making the stiffness within the range as specified above, whereby stable running of the magnetic recording medium can be obtained. For this reason, according to the present invention, durability of the magnetic recording medium can be improved.

The following is the explanation for stiffness as mentioned in connection with the present invention.

Figure 6:
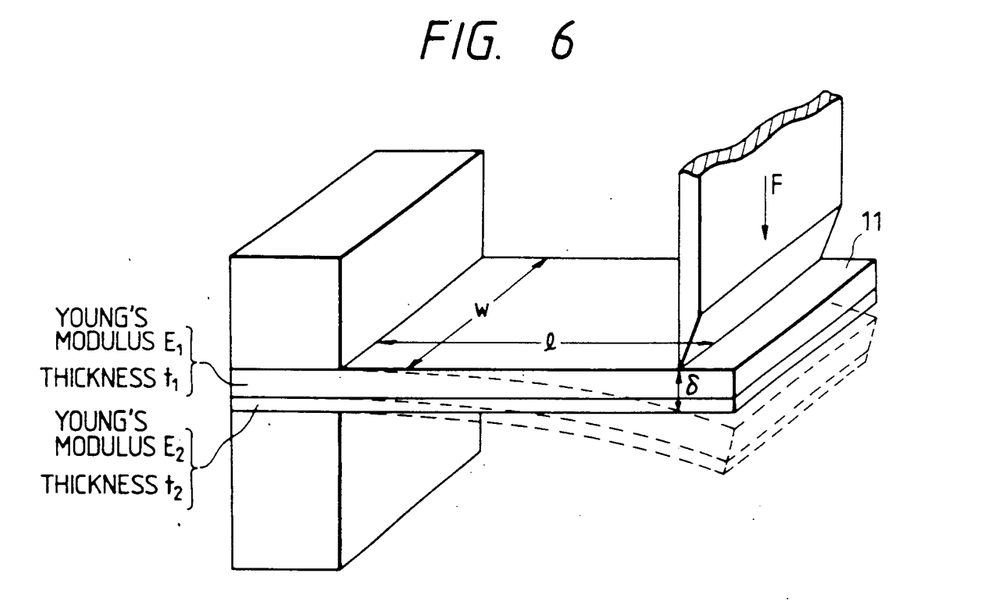
FIG. 6 is a perspective view showing the state of a bent thin film plate of a double layer structure for illustration of stiffness.

As shown in FIG. 6, when a downward force F with a distance of l from the fixed end is applied on a thin plate 11 of a double layer structure with a width W and a thickness $(t_1 + t_2)$ fixed at one end, the displacement $\delta$ at the position l is represented within the relatively smaller range of as follow:

$$\delta = \frac{1}{3(E_1 I_1 + E_2 I_2)} \cdot \frac{l^3}{W} \cdot F \quad (2)$$

$E_1, E_2$: Young's modulus
$I_1, I_2$: moment of inertia.
In the above formula (2), the whole factor multiplied before F is the compliance of flexion, of which $l^3/W$ concerns geometrical configuration, and the portion of:

$$k_0 = \frac{1}{3(E_1 I_1 + E_2 I_2)}$$

take the value reflecting the structure of the layer and the physical properties of the material constituting it. Accordingly, $1/k_0$ is defined as the stiffness as mentioned in the present invention.

$$\frac{1}{k_0} = 3(E_1 I_1 - E_2 I_2) \quad (3)$$

The above formula (3) can be also expanded in the case when the thin plate has a structure of n layer.

$$\frac{1}{k_0} = 3 \sum_{k=1}^{n} E_k I_k \quad (4)$$

That is to say, when the magnetic recording medium as a whole is comprised of n layers, including all layers constituting the magnetic recording medium such as substrate, magnetic recording layer, protective layer, and back coat, stiffness in the present invention is defined as the following:

$$\text{stiffness } 1/k_0 = 3 \sum_{k=1}^{n} E_k I_k$$

In the present invention, Young's modulus was calculated by performing tensile test. The tensile test was conducted by use of a tensile tester produced by Toyo Baldwin Co. The sample was made to have a width of 8 mm and a length of 50 mm, with the tensile speed being made 4 mm/min. (8%/min.). The Young's modulus of the substrate was calculated from the load at elongation of 0.2%. The Young's modulus of the magnetic recording layer was calculated by detracting the contribution of the substrate from the load at 0.2% elongation of the magnetic recording medium.

Next, by referring to the magnetic recording medium shown in FIG. 1 and FIG. 5 as an example, a calculation example of stiffness is shown.

In the magnetic recording medium in FIG. 1, it is now supposed that a polyimide film is used as the substrate 1 and a Co—Cr vertical magnetized film (Young's modulus 16000 kg/mm$^2$) with a thickness of 0.4 μm as the magnetic recording layer 2. The protective layer 3 and the backcoat 4 are negligible in calculation, because their thickness are very small as compared with the thickness of the substrate 1.

Figure 7:
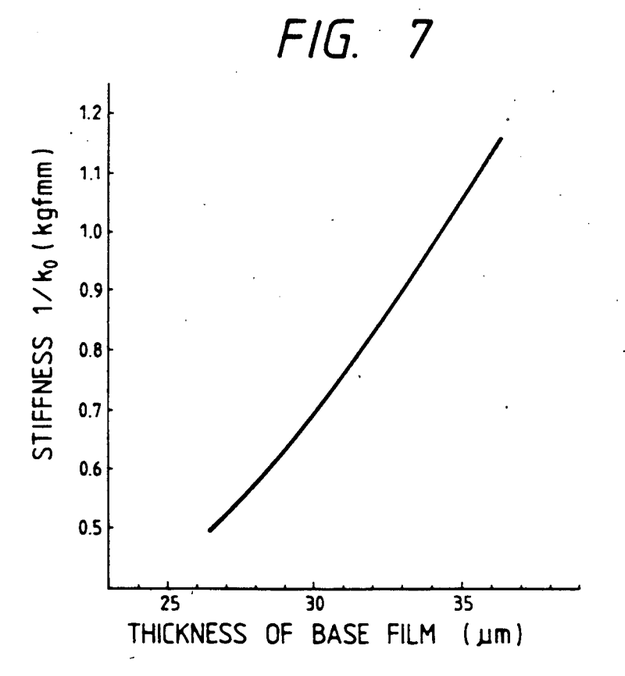
FIGS. 7 through 10 are graphs showing the relationship between thickness of substrate and stiffness.

Now, when stiffness is calculated by use of the formula (3) in the case when the polyimide film has a Young's modulus of 550 kg/mm$^2$, as shown in FIG. 7, the change in stiffness when the film thickness of the polyimide film is varied can be calculated.

In this case, the polyimide film should preferably have a thickness of 24 to 36 μm, further in the range of 26 to 31 μm.

Figure 8:
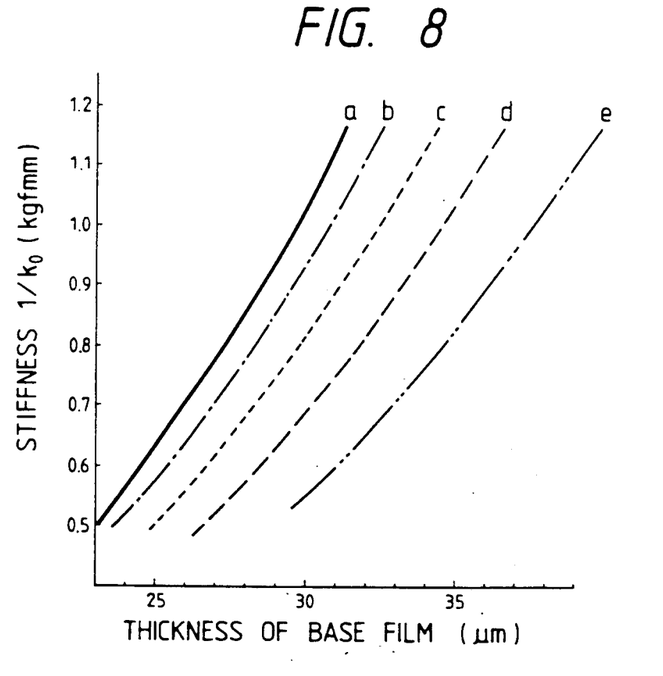

The graph in FIG. 8 shows calculation examples in the above examples, when the polyimide film has Young's modulus of a=1000 kg/mm$^2$, b=860 kg/mm$^2$, c=700 kg/mm$^2$, d=550 kg/mm$^2$, e=390 kg/mm$^2$.

Also in the case of the magnetic recording medium shown in FIG. 5, it is now supposed that a polyimide film is used as the substrate 1 and a Co—Cr vertical magnetized film (Young's modulus: 16,000 kg/mm$^2$) with a thickness of 0.4 μm as the magnetic recording layer 2, 20. In this case, the protective layer 3 and the back coat 4 are also negligible.

Figure 9:
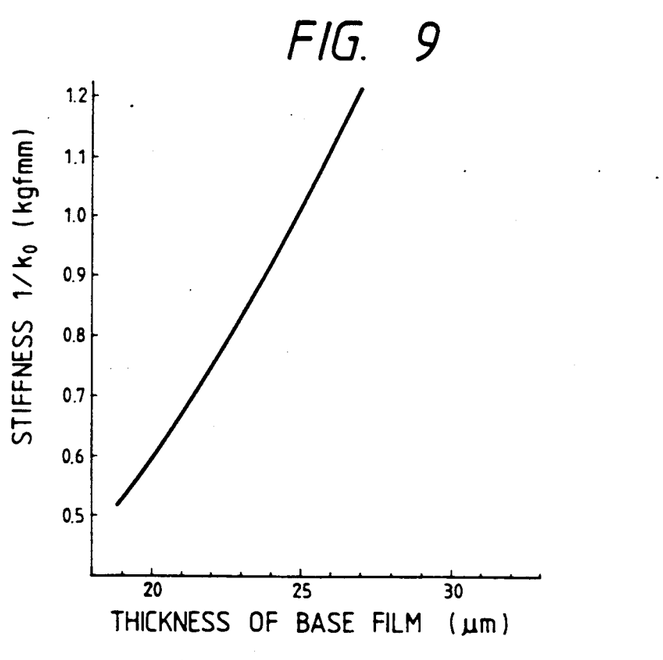

In the case when the polyimide film has a Young's modulus of 1000 kg/mm$^2$, when stiffness is calculated by use of the formula (4), the change in stiffness when the film thickness of the polyimide film is varied can be calculated as shown in FIG. 9.

In this case, the polyimide film should preferably have a thickness of 16 to 26 μm, further in the range of 18 to 22 μm.

Figure 10:
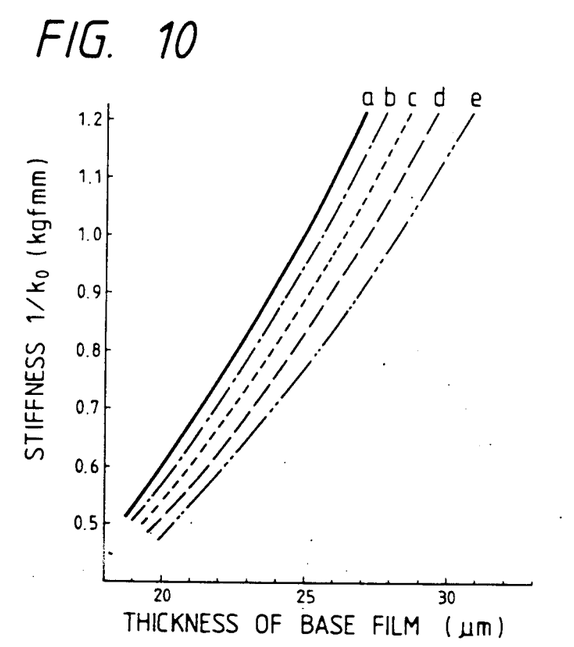

The graph in FIG. 10 shows calculation examples similarly as in FIG. 8, when the polyimide film has Young's modulus of a=1000 kg/mm$^2$, b=860 kg/mm$^2$, c=700 kg/mm$^2$, d=550 kg/mm$^2$, e=390 kg/mm$^2$.

The thickness of the respective layer of the magnetic recording medium of the present invention, which may differ depending on the material to be used, should be preferably made as follows in view of stiffness, magnetic characteristics, spacing loss, etc. of the magnetic recording medium. That is, the substrate 1 should preferably have a thickness of 36 μm or less, more preferably 30 μm or less, further preferably in the range of 15 to 30 μm; the magnetic recording layer 2, 20 preferably of 0.1 to 1 μm, further preferably in the range of 0.15 to 0.5 μm; the protective layer 3 preferably in the range of 50 to 500 Å, more preferably 50 to 200 Å; the backcoat 4 preferably in the range of 0.2 to 2 μm; and the subbing layer preferably in the range of some 100 Å to 5000 Å.

Also, the magnetic recording medium of the present invention can be effectively used as a floppy disc having small diameter, particularly a floppy disc having a diameter of 50 mm or less.

The magnetic recording medium of the present invention, as described above has the stiffness 1/k$_0$ [kgfmm] within the range of $$0.35 \times 10^{-11} \leq \frac{1}{k_0} \leq 1.15 \times 10^{-11}$$

and therefore good head touch can be obtained and running stabilized. For this reason, the magnetic recording medium of the present invention exhibits excellent durability.

The present invention is described in detail below by referring to Examples. Evaluation of Examples was performed by use of a tool deck for use in video floppy (deck in which the positions of magnetic head and pad can be varied). For Examples 1-11 and Comparative examples 1-9, a floppy disc of 2 inch in diameter was prepared as the magnetic recording medium, and the following evaluations (i) and (ii) were evaluated on the disc. However, the track used was the 25th track of 50 tracks. The rotational number was 3600 rpm.

Figure 11:
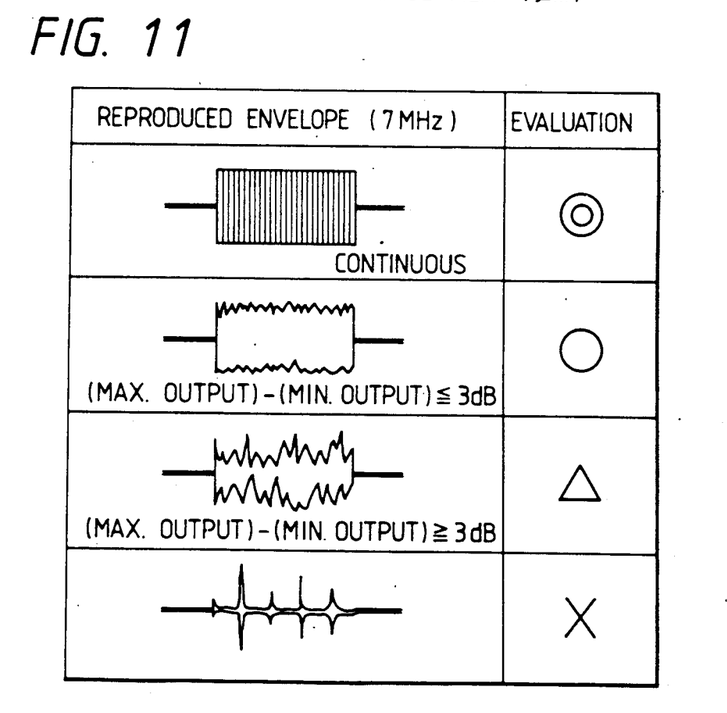
FIG. 11 is a diagram showing an example of the reproduced envelope.

(i) Head touch ... head touch was qualitatively classified into 4 ranks (⊚,○,Δ,×) according to the form of reproduced envelope at 7 MHz. FIG. 11 shows the forms of envelope as the evaluation standards. Those of ⊚, × can be provided for practical use.

(ii) Durability ... evaluated by the time before the reproduction output (7 MHz) is attenuated by −3 dB from the initial value. Durability of 48 hours or longer is preferable, but there is no problem in practical application, if it is 30 hours or longer.

EXAMPLE 1

As the substrate, a polyimide film with a thickness of 30 μm (Upilex R type, produced by Ube Kosan K.K.). The polyimide film had a coefficient of thermal expansion of 2.8×10$^{-5}$ cm/cm/°C., a Young's modulus of 390 kg/mm$^2$, a surface roughness in terms of so called ultra-smooth surface with the maximum height of 50 Å or less (measured by Taristep, hereinafter the same). For this polyimide film, before formation of the magnetic recording layer, heat treatment (200° C., 10 min.) was effected in vacuum.

On one surface of the polyimide substrate was formed a vertical magnetized film of 80 wt. % of Co and 20 wt. % of Cr with a thickness of 0.4 μm by a RF magnetron sputtering device. During the operation, the substrate temperature was 200° C. Further, on the Co—Cr film was formed a silicon dioxide thin film with a thickness of 0.02 μm as the protective film. The silicon dioxide thin film was formed by use of a silicon dioxide target by a RF magnetron sputtering device. Further, on the inorganic protective layer was formed an ester type oligomer with a thickness of about 20 Å as the lubricating layer by the vacuum vapor deposition method. On the other surface (back) of the polyimide substrate, a backcoat containing carbon particles in polyester type binder was formed with a thickness of 0.5 μm was formed. Thus, a disc of 2 inch diameter was punched out to prepare a floppy disc with a constitution as shown in FIG. 1.

The stiffness of the medium was determined by calculation to be $1/k_0 = 0.55 \times 10^{-11}$ [kgfmm]. Evaluation results of the floppy disc are shown in Table 1.

COMPARATIVE EXAMPLE 1

Example 1 was repeated except that the thickness of the substrate was made 40 μm. The stiffness of the floppy disc was calculated to be $1/k_0 = 1.17 \times 10^{-11}$ [kgfmm]. Evaluation results are shown in Table 1.

This floppy disc had great curl, and both head touch and durability were not so good.

COMPARATIVE EXAMPLE 2

Example 1 was repeated except that the thickness of the substrate was made 25 μm. The stiffness of the floppy disc was calculated to be $1/k_0 = 0.34 \times 10^{-11}$ [kgfmm]. Evaluation results are shown in Table 1.

This floppy disc had great curl, and both head touch and durability were not so good.

EXAMPLE 2

Example 1 was repeated except that the substrate was made a copolymer with a thickness of 30 μm. The copolymer comprises diamine components consisting of 70 mol % of p-phenylenediamine (PPD) and 30 mol % of diaminodiphenyl ether (DADE) and acid dianhydride components consisting of 50 mol % of biphenyltetracarboxylic dianhydride (BPDA) and 50 mol % of pyromellitic dianhydride (PMDA), and had a coefficient of thermal expansion of $1.5 \times 10^{-5}$ cm/cm/°C., a Young's modulus of 550 kg/mm$^2$, a surface roughness in terms of so called ultra-smooth surface with the maximum height of 50 Å or less. The stiffness of the floppy disc was calculated to be $1/k_0 = 0.69 \times 10^{-11}$ [kgfmm]. Evaluation results are shown in Table 1.

The floppy disc had little curl, was flat and both head touch and durability were confirmed to be excellent.

COMPARATIVE EXAMPLE 3

Example 2 was repeated except that the thickness of the substrate was made 40 μm. The stiffness of the floppy disc was calculated to be $1/k_0 = 1.49 \times 10^{-11}$ [kgfmm].

EXAMPLE 3

Example 2 was repeated except that the thickness of the substrate was made 25 μm. The stiffness of the floppy disc was calculated to be $1/k_0 = 0.43 \times 10^{-11}$ [kgfmm].

The floppy disc had little curl, and was flat.

EXAMPLE 4

Example 1 was repeated except that the substrate was made a polyimide film of Upilex S type with a thickness of 30 μm (produced by Ube Kosan K.K.). The Upilex S type had a coefficient of thermal expansion of $1.2 \times 10^{-5}$ cm/cm/°C., a Young's modulus of 1000 kg/mm$^2$, a surface roughness in terms of so called ultra-smooth surface with the maximum height of 50 Å or less. The stiffness of the floppy disc was calculated to be $1/k_0 = 1.04 \times 10^{-11}$ [kgfmm]. Evaluation results are shown in Table 1.

EXAMPLE 5

Example 4 was repeated except that the thickness of the substrate was made 25 μm. The stiffness of the floppy disc was calculated to be $1/k_0 = 0.64 \times 10^{-11}$ [kgfmm]. Evaluation results are shown in Table 1.

COMPARATIVE EXAMPLE 4

Example 4 was repeated except that the thickness of the substrate was made 40 μm. The stiffness of the floppy disc was calculated to be $1/k_0 = 2.28 \times 10^{-11}$ [kgfmm]. Evaluation results are shown in Table 1.

The floppy disc had no so great curl, but it was in contact with the jacket of the floppy disc.

EXAMPLE 6

A floppy disc which is the magnetic recording medium of the present invention shown in FIG. 5 was prepared. For the substrate 1, a polyimide film of Upilex R type with a thickness of 20 μm was used. The substrate 1 had a surface roughness of a maximum height of 50 Å or less.

On both surfaces of the substrate 1 were formed vertical magnetized films 2, 20 of Co 80 wt. % — Cr 20 wt. % with both thicknesses of 0.4 μm (the substrate temperature was 200° C.). The protective layer 3a, 3b and the backcoat layer 4 were formed as shown in FIG. 5 with the same material, preparation method and thicknesses as in Example 1.

The stiffness of the floppy disc was calculated to be $1/k_0 = 0.48 \times 10^{-11}$ [kgfmm]. Evaluation results are shown in Table 1.

EXAMPLE 7

Example 6 was repeated except that the thickness of the substrate was made 30 μm. The stiffness of the floppy disc was calculated to be $1/k_0 = 1.15 \times 10^{-11}$ [kgfmm]. Evaluation results are shown in Table 1.

COMPARATIVE EXAMPLE 5

Example 6 was repeated except that the thickness of the substrate was made 15 μm. The stiffness of the floppy disc was calculated to be $1/k_0 = 0.26 \times 10^{-11}$ [kgfmm]. Evaluation results are shown in Table 1.

The floppy disc had very bad head touch, and durability was as poor as 4 hours. Also, the floppy disc after the durability test was found to have flaws formed on the surface.

EXAMPLE 8

Example 6 was repeated except that the substrate was made a copolymer with the same composition as in Example 2 and a thickness of 20 μm.

The stiffness of the floppy disc was calculated to be $1/k_0 = 0.51 \times 10^{-11}$ [kgfmm]. Evaluation results are shown in Table 1.

COMPARATIVE EXAMPLE 6

Example 8 was repeated except that the thickness of the substrate was made 30 μm. The stiffness of the floppy disc was calculated to be $1/k_0 = 1.26 \times 10^{-11}$ about 30 minutes, and the floppy disc surface after durability test was found to have flaws formed thereon.

EXAMPLE 11

Example 9 was repeated except that the thickness of the substrate was made 16 μm. The stiffness of the floppy disc was calculated to be $1/k_0 = 0.36 \times 10^{-11}$ [kgfmm]. Evaluation results are shown in Table 1.

TABLE 1

| | Film based Polyimide | | | The surface with magnetic recording layer formed thereon | Stiffness $1/k_0$ (kgfmm) $\times 10^{-11}$ | Head touch | Durability (hours) |
|---|---|---|---|---|---|---|---|
| | Kind | Young's modulus (kg/mm²) | Thickness (μm) | | | | |
| Example 1 | Upilex R | 390 | 30 | one surface | 0.55 | ◯ | 48 or more |
| Comparative example 1 | " | " | 40 | " | 1.18 | X | 0.5 |
| Comparative example 2 | " | " | 25 | " | 0.34 | △ | 20 |
| Example 2 | Copolymer | 550 | 30 | " | 0.69 | ◉ | 48 or more |
| Comparative example 3 | " | " | 40 | " | 1.49 | X | 0.5 |
| Example 3 | " | " | 25 | " | 0.43 | ◯ | 37 |
| Example 4 | Upilex S | 1000 | 30 | " | 1.04 | ◯ | 33 |
| Example 5 | Upilex S | 1000 | 25 | one surface | 0.64 | ◯ | 48 or more |
| Comparative example 4 | " | " | 40 | " | 2.28 | X | 0.1 or less |
| Example 6 | Upilex R | 390 | 20 | Both surfaces | 0.48 | ◉ | 48 or more |
| Example 7 | " | " | 30 | " | 1.15 | ◯ | 32 |
| Comparative example 5 | " | " | 15 | " | 0.26 | X | 4 |
| Example 8 | Copolymer | 550 | 20 | " | 0.51 | ◉ | 48 or more |
| Comparative example 6 | " | " | 30 | " | 1.26 | X | 0.8 |
| Comparative example 7 | Copolymer | 550 | 15 | Both surfaces | 0.27 | X | 2 |
| Example 9 | Upilex S | 1000 | 20 | " | 0.60 | ◉ | 48 or more |
| Example 10 | " | " | 25 | " | 1.01 | ◯ | 40 |
| Comparative example 8 | " | " | 30 | " | 1.56 | X | 0.5 |
| Example 11 | " | " | 16 | " | 0.36 | ◯ | 30 |

[kgfmm]. Evaluation results are shown in Table 1.

COMPARATIVE EXAMPLE 7

Example 8 was repeated except that the thickness of the substrate was made 15 μm. The stiffness of the floppy disc was calculated to be $1/k_0 = 0.27 \times 10^{-11}$ [kgfmm]. Evaluation results are shown in Table 1.

After the durability test, the floppy disc was found to have flaws formed on the surface.

EXAMPLE 9

Example 6 was repeated except that the substrate was made of Upilex S with a thickness of 20 μm. The substrate had a surface roughness of a maximum height of 50 Å or less. The stiffness of the floppy disc was calculated to be $1/k_0 = 0.60 \times 10^{-11}$ [kgfmm]. Evaluation results are shown in Table 1.

EXAMPLE 10

Example 9 was repeated except that the thickness of the substrate was made 25 μm. The stiffness of the floppy disc was calculated to be $1/k_0 = 1.01 \times 10^{-11}$ [kgfmm]. Evaluation results are shown in Table 1.

COMPARATIVE EXAMPLE 8

Example 9 was repeated except that the thickness of the substrate was made 30 μm. The stiffness of the floppy disc was calculated to be $1/k_0 = 1.56 \times 10^{-11}$ [kgfmm]. Evaluation results are shown in Table 1.

The floppy disc had very bad head touch, durability was also poor such that output was lowered within

EXAMPLE 12

On both surfaces of a polyimide film with a thickness of 20 μm (Upilex S type, produced by Ube Kosan K.K.) were sputtered Co—Cr vertical magnetized films each to a thickness of 0.4 μm by the sputtering method. During the operation, the film temperature (can temperature) was 200° C., the reached vacuum degree $1 \times 10^{-4}$ Pa or higher, the sputtering pressure 0.45 Pa, the film forming speed 3000 Å/sec. and the target used 20 wt. % Cr—Co. Further, on the front side was formed a metal oxide film to a thickness of 100 Å as the protective film, and on the back side a backcoat layer to a thickness of 0.5 μm. That is, a Co oxide film was prepared by sputtering Co in an argon gas containing 15% oxygen, and a polyester type resin material containing carbon pigment was coated as the backcoat.

The magnetic recording medium thus formed was punched into a disc of 47 mm in diameter to form a floppy disc. The stiffness of the floppy disc was calculated to be $1/k_0 = 0.60 \times 10^{-11}$ [kgfmm].

The floppy disc had a surface roughness of the Co—Cr film surface of Rmax = 50 Å (measured by Taristep). Also, the magnetic characteristics of the Co—Cr film were measured by a vibrating sample magnetometer produced by Riken Denshi K.K. to be $\pi Ms = 4.5$ kGauss, Hc ($\perp$) = 1200 Oe, Hc ($\parallel$) = 400 Oe.

Figure 12:
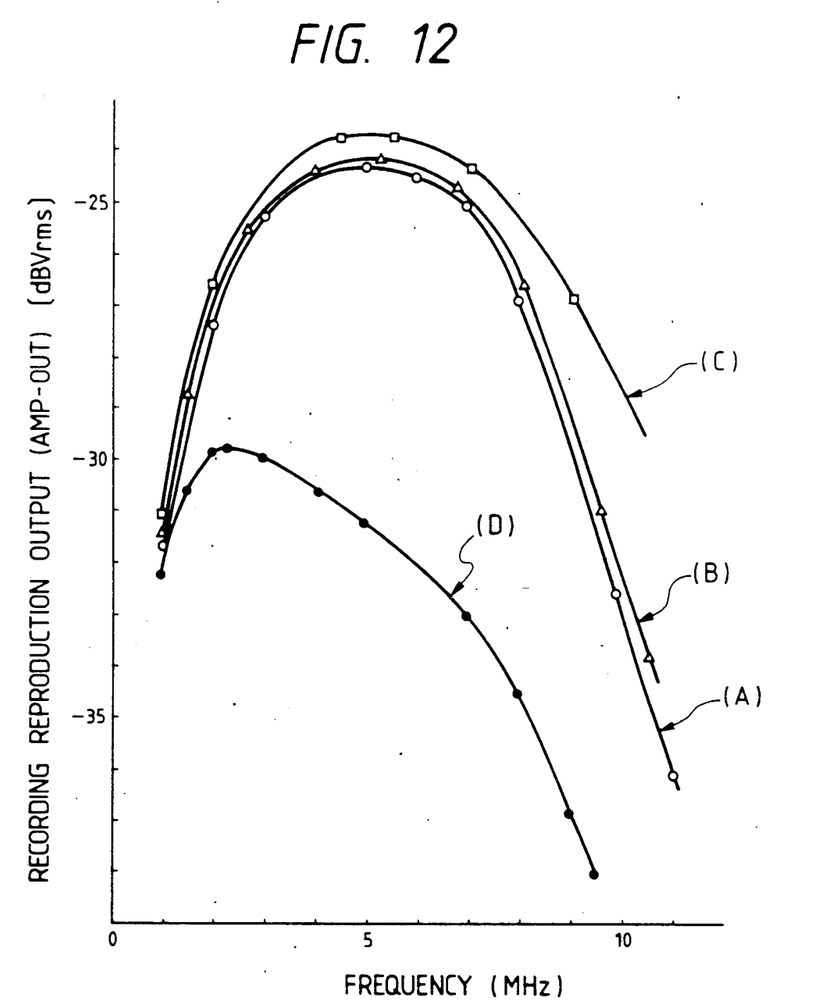
FIG. 12 is a graph showing the frequency characteristics of the magnetic recording medium in Examples 12 to 14.

FIG. 12(A) shows the results of the frequency characteristics of this medium measured by tool deck as previously mentioned. For comparison, the frequency characteristics of a commercially available coating type magnetic recording medium, a disc produced by Fuji Shashin Film K.K. (Fuji MP, 2 inch MP sheet) are shown in FIG. 12(D).

The magnetic recording medium of the present invention having the above frequency characteristics has high recording reproduction output, and therefore a recording wavelength with a short wavelength as can be used for electronic still camera can be used therefor. Thus, it could be confirmed to be very useful as the magnetic recording medium for electronic still camera.

EXAMPLE 13

A polyimide film with a thickness of 25 μm (Upilex S type, produced by Ube Kosan K.K.) was internally filled with $SiO_2$ filter with particle diameter of 450 Å to form a polyimide film having a surface of a projection height Rmax=200 Å and a projection density of $5 \times 10^6/mm^2$. On both surfaces of the film were sputtered Co—Cr vertical magnetized films to thicknesses of 0.2 μm on the front side and 0.18 μm on the back side, respectively, by the sputtering method. During the operation, the film temperature (can temperature) was 200° C., the reached vacuum degree $1 \times 10^{-4}$ Pa or higher, the sputtering pressure 0.45 Pa, the film forming speed 2500 Å/sec. and the target used 20 wt. % Cr—Co.

Next, a protective layer and a backcoat layer were formed similarly as in Example 12 to form a floppy disc of 47 mm in diameter. The stiffness of the floppy disc was calculated to be $1/k_0 = 0.68 \times 10^{-11}$ [kgfmm].

The floppy disc had a surface roughness of the Co—Cr film surface of Rmax=200 Å (measured by Taristep). Also, the magnetic characteristics of the Co—Cr film were measured similarly as in Example 12 to be 4 πMs=4.8 kGauss, Hc, (⊥)=1350 Oe, Hc (∥)=400 Oe.

FIG. 12(B) shows the results of the frequency characteristics of this medium measured by tool deck as previously mentioned.

The magnetic recording medium of the present invention having the above frequency characteristics has high recording reproduction output, and therefore a recording wavelength with a short wavelength as can be used for electronic still camera can be used therefor. Thus, it could be confirmed to be very useful as the magnetic recording medium for electronic still camera.

EXAMPLE 14.

On both surfaces of a polyimide film with a thickness of 17 μm (Upilex S type, produced by Ube Kosan K.K.) were formed permalloy film (Ni 78 wt. %, JIS PC material) each to a thickness of 0.2 μm by the sputtering method. During the operation, the film temperature (can temperature) was made 20° C. (water cooled), the reached vacuum degree $1 \times 10^{-4}$ Pa or higher, the sputtering pressure 0.6 Pa, and the film forming speed 3000 Å/sec.

Next, on the permalloy films were formed Co—Cr vertical magnetized films each to a thickness of 0.2 μm by the sputtering method. During the operation, the film temperature (can temperature) was 200° C., the reached vacuum degree $1 \times 10^{-4}$ Pa or higher, the sputtering pressure 0.45 Pa, the film forming speed 2500 Å/sec., and the target used 20 wt. % Cr—Co.

Next, a protective layer and a backcoat layer were formed similarly as in Example 12 to form a floppy disc of 47 mm in diameter. The stiffness of the floppy disc was calculated to be $1/k_0 = 0.41 \times 10^{-11}$ [kgfmm].

The magnetic recording layer surface of the floppy disc had a surface roughness of Rmax=150 Å (measured by Taristep). The magnetic characteristics of the Co—Cr film were the same as in Example 13.

FIG. 12(C) shows the results of the frequency characteristics of this medium.

The magnetic recording medium of the present invention having the above frequency characteristics has high recording reproduction output, and therefore a recording wavelength with a short wavelength as can be used for electronic still camera can be used therefor. Thus, it could be confirmed to be very useful as the magnetic recording medium for electronic still camera.

EXAMPLE 15

On both surfaces of a polyimide film having a thickness of 25 μm and a Young's modulus of 850 kg/mm² were formed Co—Cr magnetic recording layers with a thickness of 0.35 μm by RF sputtering. As the result of substrate heating effected at 150° C., the magnetic characteristics were found to be Hc=1200 Oersted, 4 πMs=4.3 KG. Further, Cr composition ratio is 20%. With a fluorine oil applied on one surface, the recording medium was punched into a disc of 47 mm in outer diameter and running test was conducted in a disc rotation system of one surface ring head access, whereby good head touch was exhibited. Head touch was judged by the envelope wave form of recording reproduction of the signal with a wavelength of about 0.8 μm. The stiffness of the floppy disc was calculated to be $1/k_0 = 0.87 \times 10^{-11}$ [kgfmm].

What is claimed is:

1. A disc-shaped magnetic recording medium, comprising:
a magnetic recording layer of a vertically magnetized vapor deposited metal thin film on a substrate having a diameter of at most 50 mm, wherein the stiffness $1/k_0$ [kgfmm] of the recording medium is:

$$0.35 \times 10^{-11} \leq 1/k_0 \leq 1.15 \times 10^{-11}$$

$$\text{wherein } 1/k_0 = 3 \sum_{k=1}^{n} E_k I_k,$$

n is a number of layers constituting the magnetic recording medium;
$E_k$ is Young's modulus (kgf/mm²) of the k th layer and
$I_k$ is moment of inertia (mm³) of the k th layer.

2. A magnetic recording medium according to claim 1, wherein $1/k_0$ is in the following range:

$$0.45 \times 10^{-11} \leq 1/k_0 \leq 0.75 \times 10^{-11}.$$

3. A magnetic recording medium according to claim 1, wherein said substrate is formed of a polyimide.

4. A magnetic recording medium according to claim 1, wherein said magnetic recording layer is only on one surface of said substrate.

5. A magnetic recording medium according to claim 1, wherein said magnetic recording layer is on both surfaces of said substrate.

6. A magnetic recording medium according to any of claims 1, 4 or 5, wherein said magnetic recording layer is a Co—Cr film.

7. A magnetic recording medium according to claim 3, wherein said substrate has a thickness of from 24 to 36

μm and said magnetic recording layer is formed of a Co—Cr film.

8. A magnetic recording medium according to claim 7, wherein said substrate has a thickness of from 26 to 31 μm.

9. A magnetic recording medium according to claim 5, wherein said substrate is formed of a polyimide having a thickness of from 16 to 26 μm and said magnetic recording layer is formed of a Co—Cr film.

10. A magnetic recording medium according to claim 9, wherein said substrate has a thickness of from 18 to 22 μm.

11. A magnetic recording medium according to claim 5, wherein said magnetic recording layer on both surfaces of said substrate is a Co—Cr film having a protective layer of $SiO_2$ in this order from said substrate.

* * * * *

UNITED STATES PATENT AND TRADEMARK OFFICE
CERTIFICATE OF CORRECTION

PATENT NO. : 5,055,351

DATED : October 8, 1991

INVENTOR(S) : RYO FUJIMOTO ET AL.

It is certified that error appears in the above-identified patent and that said Letters Patent is hereby corrected as shown below:

Title Page:

AT [56] REFERENCES CITED

Foreign Patent Documents,
        "261020 11/1985 Japan." should read
        --261020 12/1985 Japan.--.

COLUMN 1

Line 28, "a topic in" should read --interest--.
    Line 32, "progressed" should read --proposed--.
    Line 62, "so called" should read --so-called--.
    Line 68, "so" should read --so- --.

COLUMN 4

Line 22, "whereby" should read --thereby--.
    Line 66, "Co-NI-O," should read --Co-Ni-O,--.

COLUMN 5

Line 64, "magnetic recording layer 2, 20" should read --magnetic recording layers 2, 20--.

COLUMN 6

Line 29, "layer" (second occurrence) should read --layers--.
    Line 48, "follow:" should read --follows:--.

COLUMN 7

Line 30, "detracting" should read --subtracting--.

UNITED STATES PATENT AND TRADEMARK OFFICE
CERTIFICATE OF CORRECTION

PATENT NO. : 5,055,351

DATED : October 8, 1991

INVENTOR(S) : RYO FUJIMOTO ET AL.

It is certified that error appears in the above-identified patent and that said Letters Patent is hereby corrected as shown below:

COLUMN 8

Line 27, "above" should read --above,--.
    Line 40, "floppy" should read --floppy disc--.
    Line 65, "so called" should read --so-called--.

COLUMN 9

Line 2, "vacum." should read --vacuum.--.
    Line 17, "was formed" should be deleted.
    Line 53, "so called" should read --so-called--.

COLUMN 10

Line 11, "so called" should read --so-called--.
    Line 28, "not so great curl, but it" should read --some curl, and--.

COLUMN 12

Line 64, "$\pi Ms=4.5$ kGauss," should read --$4\pi Ms=4.5$ kGauss,-- and "Hc($\|$)=400 Oe." should read --Hc($/\!/$)=400 Oe.--.

COLUMN 13

Line 36, "($\|$)=400 Oe." should read --($/\!/$)=400 Oe.--.

UNITED STATES PATENT AND TRADEMARK OFFICE
CERTIFICATE OF CORRECTION

PATENT NO.   : 5,055,351
DATED        : October 8, 1991
INVENTOR(S)  : RYO FUJIMOTO ET AL.

It is certified that error appears in the above-identified patent and that said Letters Patent is hereby corrected as shown below:

<u>COLUMN 14</u>

Line 36, "vapor deposited" should read --vapor-deposited--.
Line 43, "wherein" should read --wherein:-- and "$E_k I_k$," should read --$E_k I_k$, and--.
Line 47, "layer" should read --layer;--.
Line 59, "only on" should read --on only--.

Signed and Sealed this

Twenty-fifth Day of May, 1993

Attest:

MICHAEL K. KIRK

*Attesting Officer*         Acting Commissioner of Patents and Trademarks